CONTROLLABLE GATED PULSE SIGNAL PROVIDING CIRCUIT

Filed Aug. 26, 1966 2 Sheets-Sheet 1

WITNESSES:

Bernard R. Gieguez

James T. Young

INVENTOR

James F. Sutherland

BY [signature]

ATTORNEY

CONTROLLABLE GATED PULSE SIGNAL PROVIDING CIRCUIT

Filed Aug. 26, 1966 2 Sheets-Sheet 2

United States Patent Office
3,395,362
Patented July 30, 1968

3,395,362

CONTROLLABLE GATED PULSE SIGNAL PROVIDING CIRCUIT

James F. Sutherland, Pittsburgh, Pa., assignor to Westinghouse Electric Corporation, Pittsburgh, Pa., a corporation of Pennsylvania
Filed Aug. 26, 1966, Ser. No. 575,455
5 Claims. (Cl. 331—57)

ABSTRACT OF THE DISCLOSURE

A gated pulse signal providing circuit includes a ring of successive signal inverting logic circuit devices having a capacitor coupled between the outputs of two of those devices for controlling the rate of the output pulse signals generated and having an enabling circuit operative with one of said devices which is cooperative with that capacitor to determine the selective provision of either a single output pulse signal or a plurality of output pulse signals having controlled rate and wave shape characteristics.

This invention relates to an improvement in a pulse signal providing circuit for generating an output pulse train having a rate that is variable as desired between a one shot pulse and a plurality of pulses over a wide range of pulse widths and which starts promptly when enabled by an applied control signal.

It has been known in the prior art to provide a pulse train generating ring circuit including three signal inverter devices which successively operate to provide a continuous train of ouput pulses. This circuit has one disadvantage in that a variable width pulse output and a variable duty cycle, or the ratio of pulse width to the total cycle time, are not readily available.

It is an object of this invention to provide an improved gated pulse signal generation circuit for generating output signals in the form of selectively a one shot pulse or a pulse train having a controlled pulse rate that is variable over a wide range as may be desired. The present apparatus has several improvements of operation in that it can operate as a free running pulse generator or can be controlled by an applied control pulse to determine better the rate and duty cycle of the generated output pulses, which pulses have excellent rise time and fall time characteristics and have desired flat top wave shapes for subsequent utilization.

In accordance with the present invention a controllable gated clock pulse train or one shot pulse signal generating circuit is provided. It includes three NAND logic circuits interconnected as a ring of three successive signal inverting devices, having a capacitor connected between two of the device outputs for controlling the output pulse train rate thereby generated. Additionally, a bi-stable operation enabling circuit can be connected to control the operation of the particular logic device having its input responsive to the connection of that capacitor to determine the selective provision of a one shot single output signal having desired characteristics or a plurality of output pulses with controlled pulse rate and wave shape characteristics as desired.

The invention will be explained in considerably greater detail in connection with the accompanying drawings illustrating a currently preferred embodiment of the invention and wherein:

FIGURE 1 is a diagrammatic showing of a prior art ring of three pulse generating circuit;

FIG. 1*a* shows typical output pulse signals from the FIG. 1 circuit;

FIG. 2 is a diagrammatic showing of the improved ring of three pulse generating circuit in accordance with the teachings of the present invention;

FIG. 2*a* shows typical output pulse signals from the FIG. 2 circuit;

FIG. 3 is an illustration of a further modification of the present pulse generating circuit;

FIG. 3*a* shows typical output pulse signal from the FIG. 3 circuit. A second pulse signal will occur only if the applied start control signal exceeds in duration the interval $T_0$;

FIG. 3*b* shows a start control signal utilized to obtain a single output pulse signal shown in FIG. 3*a*;

In high speed logic circuits the need for a simple pulse signal generator circuit often arises as a clock signal source or the like. The pulse rate of this circuit should preferably be variable over a wide range, and the circuit must always start when enabled by an applied control input signal. Still other logic circuit applications require a one shot output pulse signal which will output a single predetermined characteristic pulse signal when enabled by an applied control input signal.

Figure 1:
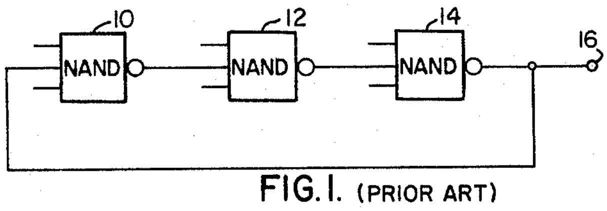
FIG. 1. (PRIOR ART)
Figure 1A:

In FIG. 1 there is shown a first signal inverter 10, a second signal inverter 12 and a third signal inverter 14 connected in a ring of three circuit arrangement well known in the prior art. Each of these signal inverters can comprise a well known NAND logic circuit. The pulse generating circuit shown in FIG. 1 is effectively self-starting to provide a train of output pulses, with the output signal from the inverter circuit 14 being fed to an input of the inverter circuit 10 such that if at any given instant of time the output signal of the inverter circuit 14 is one the output signal from the inverter circuit 10 will then become zero. This will cause the subsequent inverter circuit 12 to provide a one output signal, which causes the signal inverter circuit 14 to switch its output signal to a zero value. This at present zero value signal when fed back to the input of the signal inverter circuit 10 causes a one value signal from the signal inverter 10 which would cause the signal inverter circuit 12 to provide a zero value signal which in turn causes the signal inverter circuit 14 to provide a one value output signal, and so forth. It should be readily apparent that the output signal of the signal inverter circuit 14 when supplied through an output terminal 16 will comprise a train of output pulse signals, as shown to the right of FIG. 1, having a typical length of $1/10$ of a microsecond or 50 nanoseconds per pulse, depending upon the signal characterisics of the NAND logic devices used.

Figure 2:
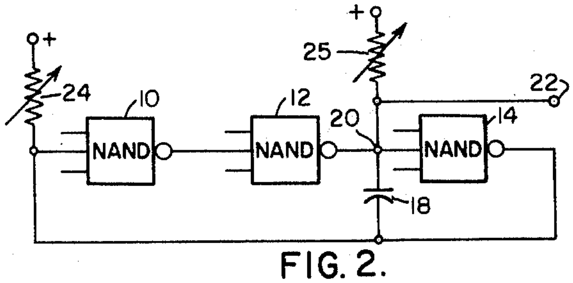
Figure 2A:
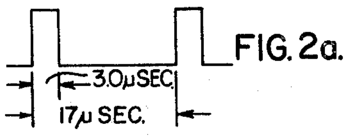

In FIG. 2 there is shown an improved ring of three pulse generating circuit in accordance with the teachings of the present invention, wherein the signal inverter circuits 10, 12 and 14 are connected as they were in FIG. 1; however, a capacitor 18 is now connected between the input to the signal inverter circuit 14 and the output of the signal inverter circuit 14, with the output pulse signal from the circuit being supplied from the circuit junction 20 to an output terminal 22. A typical output pulse signal from the FIG. 2 circuit may have a pulse width of three microseconds and a time period between pulses of 17 microseconds as shown to the right of FIG. 2. Thusly it is seen that the circuit shown in FIG. 2 operates at a slower pulse rate and the pulse width is variable by adjusting the provided resistor 24 connected as shown in FIG. 2 to provide both a variable pulse width and a variable duty cycle as may be desired.

Figure 3:
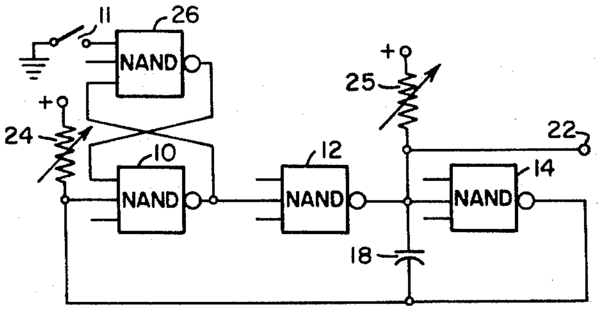

In FIG. 3 a more universal free running pulse signal generating circuit is illustrated, including the signal inverting circuit 10, the signal inverting circuit 12, and the signal inverting circuit 14 and the capacitor 18 and adjustable resistor 24 shown in FIG. 2. The FIG. 2 circuit operates at a slower pulse rate and variable pulse width. The resistor 24 of FIG. 2 permits adjustment of the OFF or ZERO time of the output pulse from terminal 22 and the resistor 25 permits adjustment of the ON or ONE time of this output pulse; the capacitor 18 determines the broad range adjustment of the output pulse rate and width.

Additionally in FIG. 3 there is shown a bi-stable enabling circuit including a NAND logic device 26 and so connected with the NAND signal inverting logic device 10 that the output signal from the NAND logic device 26 is applied to the input of the NAND logic device 10 and the output signal from the NAND logic device 10 is applied to the input of the NAND logic device 26 to provide a bi-stable operation enabling circuit. The output pulse signals generated by the FIG. 3 circuit are supplied through the terminal 22.

Figure 4:
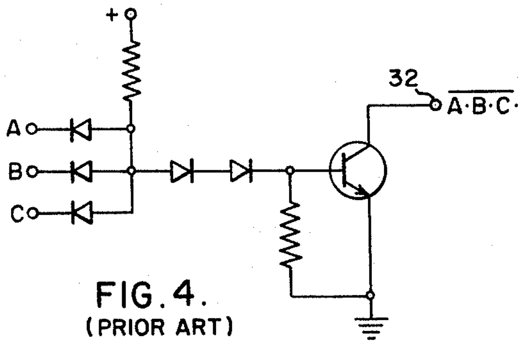
FIG. 4. (PRIOR ART)
FIG. 4 is a schematic diagram of a well known NAND logic device per se.

In FIG. 4 there is schematically shown a typical NAND logic device such as utilized in FIGS. 1, 2 and 3. This is a very well known circuit and operative such that applied input signals A, B and C are effectively supplied through an output terminal 32 in the form of inverted signals A and B and C. The logic operation is generally equivalent to that provided by an AND circuit followed by a NOT or signal inverting circuit.

Figure 5:
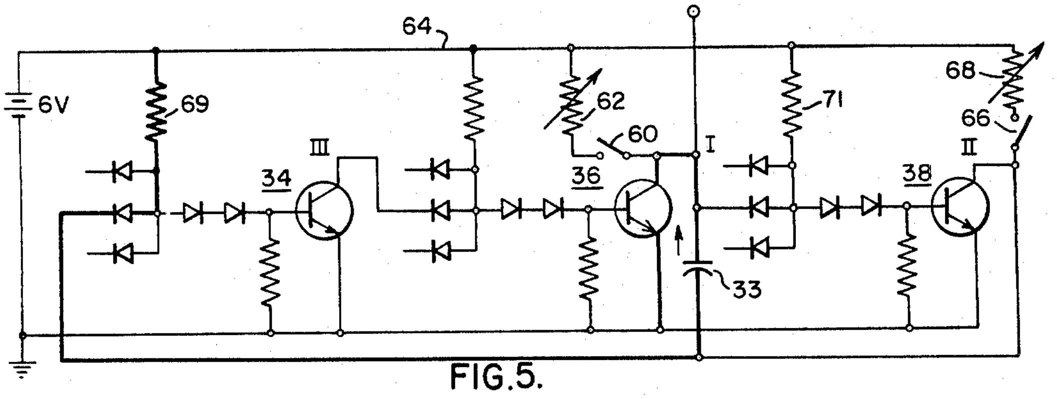
FIG. 5 is a schematic diagram of the modified pulse generating circuit diagrammatically shown in FIG. 2 and included for the purpose of illustrating current flow through the circuit under a first operating condition.

In FIG. 5 there is shown a ring of three pulse generating circuit, including NAND logic devices 34, 36 and 38, with the additional provision of a capacitor 33 connected between the output of the second NAND logic device 36 and the output of the third NAND logic device 38. In FIG. 5 there is shown the transistor within the NAND logic device 36 conducting such that a voltage build up is taking place across the capacitor 33 due to current flow in the direction of the arrow until the threshold voltage level of the transistor within NAND logic device 34 is reached to cause the latter transistor to begin to conduct.

Figure 6:
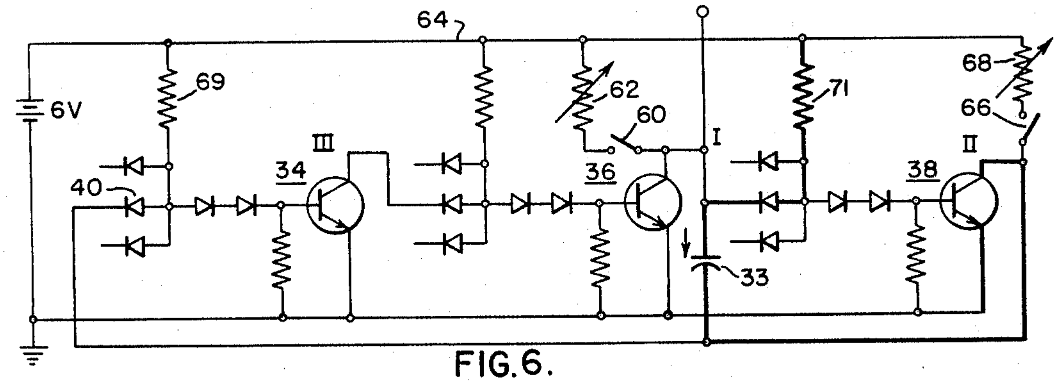
FIG. 6 is a schematic diagram of the FIG. 2 pulse generating circuit and included to illustrate the current path during a second interval or condition of operation thereof.

In FIG. 6 there is shown three NAND logic devices 34, 36 and 38 connected in a ring of three pulse generating circuit as shown in FIG. 2 with the capacitor 33 shown connected between the output of the second NAND logic device 36 and the output of the third NAND logic device 38. In FIG. 6 there is shown a second operating condition of the FIG. 2 circuit, with the transistor within the logic device 38 conducting to discharge the capacitor 33 through the emphasized circuit of FIG. 6 and with current flow in the direction of the arrow.

Figure 3A:
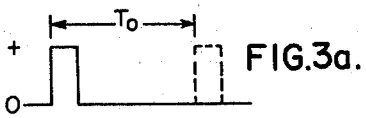
Figure 3B:
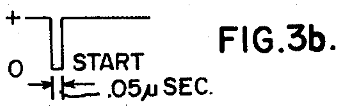

In the operation of the apparatus shown in FIG. 3 if a start control pulse is applied to input terminal 11 in the form of a grounded start control signal, and this start control pulse is shorter in time as shown in FIG. 3*b* than the cycle time interval or pulse providing time of the pulse generating circuit as shown in FIG. 3*a* and as determined by the adjustable resistor 24 in conjunction with the capacitor 18, only one output pulse will be generated. However if a start control pulse is applied to the input control terminal 11 having a length greater than the time interval $T_0$ shown in FIG. 3*a* between output pulses supplied by the pulse generating circuit shown in FIG. 3, the latter circuit will provide a train of output pulse signals which pulses have excellent rise time and fall time characteristics and have very flat tops to the generated wave shape. By using a large capacitor 18, in the order of 1.0 microfarad for a one pulse per second output pulse rate, very slow rates can also be obtained from the circuit shown in FIG. 3. Even when the pulse rate is slowed down with a large capacitor, the rise and fall times of the output pulses are still 10 to 20 nanoseconds with standard NAND logic devices in the form of presently commercially available Westinghouse integrated circuit packages WM–221–T. The pulse generating circuit shown in FIG. 3 has a substantial advantage from being more simple through using only one capacitor 18 and having the ability to free run over an extremely wide range of pulse rates. This advantage coupled with its selective ability to output a single rectangular pulse having a predetermined pulse length determined by adjustment of the resistor 24 on command from a 50 nanosecond start control pulse as shown in FIG. 3*b* applied to the input terminal 11 enables the pulse generating circuit shown in FIG. 3 to be universal in application; a second pulse will be generated only if the time duration of this enabling start control pulse is greater than the particular time interval $T_0$ of the circuit as determined by the resistor 24 in conjunction with the capacitor 18.

To illustrate the operation of the FIG. 2 circuit in greater detail, reference should now be made to the circuit schematics shown in FIGS. 5 and 6. A reference to the voltage waveforms shown in FIG. 7 in relation to the output I of NAND logic device 36, the output II of NAND logic device 38, and the output III of NAND logic device 34 respectively may also now be in order. As shown in Curve I of FIG. 7 corresponding to the voltage condition of output I of NAND logic device 36, the NAND logic device 36 becomes conducting at time $T_1$. As shown in FIG. 5 the current path with the transistor of NAND logic device 36 conducting is shown in emphasized manner such that the voltage level at the output I of NAND device 36 becomes zero or ground potential at time $T_1$, as shown in Curve I. As shown in Curve II the voltage level at output II from NAND logic device 38 commences to build up in value at time $T_1$, and the output III of NAND logic device 34 increases in value at time $T_1$ as shown by Curve III. Upon the voltage at output II of NAND logic device 38 rising to the threshold point VT of logic device 34. (1.2 volts or two diode drops), the transistor of logic device 34 will start to conduct at time $T_2$ causing a rounding of the corner in the voltage level at output III and as shown in CURVE III. When logic device 34 conducts, then the logic device 36 is cutoff and the voltage level at output I of the logic device 36 rises to a value of about 1.2 volts (two diode drops above ground). The voltage level across the capacitor 33 cannot change instantaneously, so the voltage at output II of logic device 38 jumps up about 1.2 volts higher at time $T_2$ than the threshold voltage VT shown in Curve II of FIG. 7. The diode 40 is now back biased and therefore the transistor of logic device 34 is driven hard into conduction pulling output III of the logic device 34 to a zero level at time $T_2$ as shown in Curve III of FIG. 7.

The logic device 38 now begins to conduct as shown in heavy circuit lines of FIG. 6. When the capacitor 33 has discharged as shown in Curve II of FIG. 7 through the transistor of logic device 38 sufficiently for output II to drop to the threshold voltage of logic device 34 at time $T_3$ the logic device 34 will begin to block. With the latter device blocking, the logic device 36 will be driven into conduction and output I of the logic device 36 will again be pulled to a zero or ground level voltage. The voltage across the capacitor 33 cannot change instantaneously so the voltage at output II of logic device 38 must drop by about two diode drops (1.2 volts) at which time the diode 40 is forward biased and the base drive is removed from the logic device 34 allowing the latter logic device to block.

Figure 7:
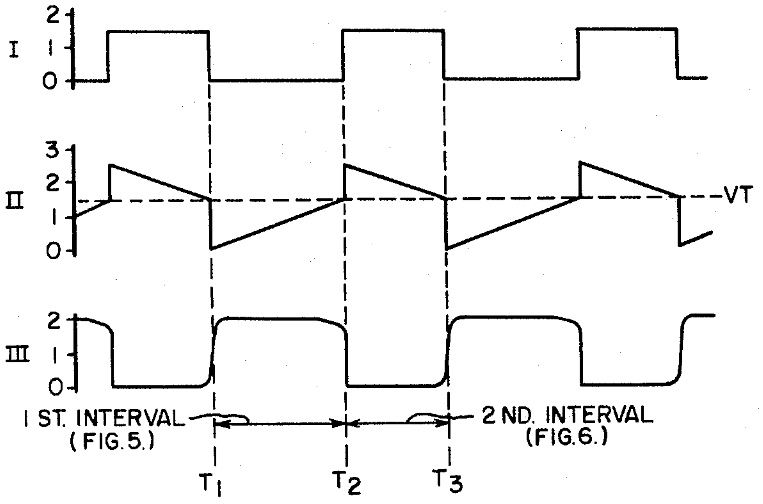
FIG. 7 is a curve chart illustrating the voltage conditions at selected portions of the schematic circuit during the first and second operating conditions illustrated in FIGS. 5 and 6.

If the switch 60 shown in FIG. 6 is closed to introduce the resistor 62 having a value of 1000 ohms and being connected from output I to the six volt bus 64 in parallel with the resistor 71, the time interval between $T_2$ and $T_3$ as shown in FIG. 7 is shortened because the capacitor 33 will now be discharged down to the threshold voltage level VT shown in Curve II faster. Instead of only a 3,000 ohm series resistance driving the integrator comprising the logic device 38, the resistor diode parallel path increases the discharge current of the capacitor 33 but not proportionally to the decrease in series resistance. A non-symmetrical output is provided with the zero value signal time amounting to about 85% of the total cycle.

If instead the switch 66 is closed to introduce the resistor 68 having a 1,000 ohm resistance in circuit connection between the output II of the logic device 38 and the six volt bus 64 in parallel with resistor 69, the interval between $T_1$ and $T_2$ shown in FIG. 7 is shortened since the capacitor 33 is now charged to the threshold voltage level VT shown in Curve II of FIG. 7 in one-quarter the former time interval. The equivalent resistance of 750 ohms, comprising the 1,000 ohm resistor 68 in parallel with the 3,000 ohm resistor 69 yields an RC time constant of one-quarter the former time interval. A non-symmetrical output is now provided with the zero time amounting to about 20% of the total duty cycle. Suitable component values for utilization in the actual practice of the present invention and in accordance with the circuit of FIGS. 5 and 6 are as follows:

| | |
|---|---|
| NAND logic devices **34**, **36** and **38**. | Current Westinghouse integrated circuit package WM–221–T. |
| R62 | 1000 ohms. |
| R68 | 1000 ohms. |
| C33 | .02 microfarad. |
| R69 | 3000 ohms. |

Various modifications and adaptations of the present invention may be made within the scope and spirit thereof.

I claim:

1. In pulse signal providing apparatus, the combination of a plurality of similar signal inverting logic circuits each having an input and an output, with the input of each signal inverting logic circuit being connected to the output of a succeeding and different one of the other signal inverting logic circuits such that a continuous ring circuit is thereby effected, an output signal supplying terminal connected to the output of a selected one of said signal inverting logic circuits for providing a train of output pulse signals, and signal storage means connected between the respective outputs of a predetermined two of said signal inverting logic circuits for controlling the pulse rate of said train of output pulse signals.

2. The pulse signal providing apparatus of claim 1, with a signal controlling impedance member connected to the input of one of said logic circuits in said ring circuit and being variable in impedance value for providing a variable output pulse from said output signal supplying terminal.

3. The pulse signal providing apparatus of claim 2, with said signal controlling impedance member being connected between said output signal supplying terminal and the output of the next succeeding signal inverting logic circuit in said ring circuit.

4. In pulse signal providing apparatus, the combination of a plurality of similar signal providing logic circuits each having an input and an output, with the output of each signal providing logic circuit being connected to the input of a succeeding and different one of the other signal providing logic circuits such that a continuous ring output pulse providing circuit is thereby effected, an output signal supplying terminal connected to the output of one of said signal providing logic circuits, at least one variable impedance member operative with the input of a predetermined one of said logic circuits in said pulse providing circuit and being variable in impedance value for providing a variable output pulse from said output signal supplying terminal.

5. The pulse signal providing apparatus of claim 4, with at least one impedance member connected to one of said signal logic circuits, and with a bi-stable control circuit being operative with a selected signal providing logic circuit to control the conductivity of the latter said logic circuit and thereby to control the provision of said output signal.

References Cited

UNITED STATES PATENTS 3,122,652 2/1964 Kobbe et al. ------ 331—111 X

ROY LAKE, *Primary Examiner.*

S. H. GRIMM, *Assistant Examiner.*